United States Patent
Lai

(10) Patent No.: US 8,251,826 B2
(45) Date of Patent: Aug. 28, 2012

(54) TRANSMISSION DEVICE HAVING OVERLOAD PROTECTION SUBASSEMBLY

(75) Inventor: Jin-Shi Lai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 320 days.

(21) Appl. No.: 12/608,962

(22) Filed: Oct. 29, 2009

(65) Prior Publication Data

US 2010/0108457 A1 May 6, 2010

(30) Foreign Application Priority Data

Oct. 31, 2008 (CN) .......................... 2008 1 0305354

(51) Int. Cl.
*F16D 7/04* (2006.01)
(52) U.S. Cl. ........................ 464/37; 192/56.1
(58) Field of Classification Search ............... 464/37, 464/38; 192/56.1, 71, 79
See application file for complete search history.

(56) References Cited

U.S. PATENT DOCUMENTS

| | | | | |
|---|---|---|---|---|
| 1,155,220 A * | 9/1915 | De Marais | ................... | 192/71 X |
| 1,562,442 A * | 11/1925 | Evans | ............................... | 464/37 |
| 1,587,724 A * | 6/1926 | Harley | ........................ | 464/37 X |
| 1,611,940 A * | 12/1926 | Ohmer | .............................. | 464/37 |
| 1,629,036 A * | 5/1927 | Kitrell | ............................... | 464/37 |
| 1,865,559 A * | 7/1932 | De Montgrand | ................ | 464/37 |
| 2,135,929 A * | 11/1938 | Wood | ............................... | 464/37 |
| 2,501,648 A * | 3/1950 | Ogden | ............................ | 464/38 |
| 2,514,228 A * | 7/1950 | Dodge | ........................ | 464/37 X |
| 2,930,212 A * | 3/1960 | Walterscheid-Muller et al. | ................................ | 464/37 |
| 2,938,613 A * | 5/1960 | Williams | ..................... | 464/37 X |
| 3,565,222 A * | 2/1971 | Kimoto et al. | .................. | 192/71 |
| 3,583,734 A * | 6/1971 | Magi | ........................... | 464/38 X |
| 3,593,542 A * | 7/1971 | Urayama | ......................... | 464/37 |
| 3,724,815 A * | 4/1973 | Hawkins et al. | ............. | 464/37 X |
| 4,043,437 A * | 8/1977 | Taylor | ......................... | 464/37 X |
| 4,468,206 A * | 8/1984 | Herchenbach et al. | .......... | 464/37 |
| 4,588,060 A * | 5/1986 | Norton | ......................... | 192/71 X |
| 4,848,547 A * | 7/1989 | Kampf | ......................... | 192/71 X |
| 5,342,241 A * | 8/1994 | Kampf | ............................ | 464/37 |
| 5,386,897 A * | 2/1995 | Yang | ............................. | 192/71 X |
| 5,480,015 A * | 1/1996 | Yang | ............................. | 192/56.1 |
| 5,643,089 A * | 7/1997 | Hummel | ......................... | 464/37 |

(Continued)

FOREIGN PATENT DOCUMENTS

DE 912411 * 5/1954 ..................... 464/37

*Primary Examiner* — Gregory Binda
*Assistant Examiner* — Matthieu Setliff
(74) *Attorney, Agent, or Firm* — Altis Law Group, Inc.

(57) ABSTRACT

A transmission device includes a first transmission mechanism and a second transmission mechanism. The first transmission mechanism includes a first rotating portion and an engaging portion fixed on the first rotating portion. The second transmission mechanism includes a second rotating portion and at least one overload protection subassembly. The at least one overload protection subassembly includes a transmission member pivotally attached on the second rotating portion and two flexible members resisting against an opposite end of the transmission member at two opposite rotating directions of the transmission member to make the transmission member locate at a non-rotatable position with respect to the first rotating portion. An end of the transmission member engages the engaging portion to rotate with the first transmission mechanism.

1 Claim, 3 Drawing Sheets

U.S. PATENT DOCUMENTS

| | | | |
|---|---|---|---|
| 5,706,922 A * | 1/1998 | Bondioli | 192/71 X |
| 5,718,634 A * | 2/1998 | Mikeska et al. | 464/37 |
| 5,916,325 A * | 6/1999 | Madrid et al. | 464/37 X |
| 5,924,536 A * | 7/1999 | Frenken | 192/56.1 |
| 6,174,238 B1 * | 1/2001 | Bondioli | 464/37 |
| 6,196,924 B1 * | 3/2001 | Kampf et al. | 464/37 |
| 6,325,163 B2 * | 12/2001 | Tibbitts | 464/37 X |
| 6,666,283 B2 * | 12/2003 | Frauhammer et al. | 464/37 X |
| 6,886,434 B2 * | 5/2005 | Hu | 81/467 |
| 6,896,621 B2 * | 5/2005 | Carstensen et al. | 464/37 |
| 7,367,891 B2 * | 5/2008 | Bae | 464/37 X |
| 7,611,414 B2 * | 11/2009 | Mueller et al. | 464/38 |
| 8,011,063 B2 * | 9/2011 | Sandberg | |
| 2006/0234798 A1 * | 10/2006 | Chang | 464/38 |
| 2009/0314110 A1 * | 12/2009 | Mueller et al. | 464/37 X |
| 2011/0081976 A1 * | 4/2011 | Lee et al. | 464/37 |

* cited by examiner

TRANSMISSION DEVICE HAVING OVERLOAD PROTECTION SUBASSEMBLY

BACKGROUND

1. Technical Field

The present disclosure relates to transmission devices, and particularly to a transmission device having an overload protection subassembly.

2. Description of Related Art

One way to protect overloaded transmissions is to use fuses. When the transmission is overloaded, the fuse is blown. However, to replace the fuse is time consuming and inconvenient.

Therefore, it is desirable to provide a transmission device which can overcome the above-mentioned problems.

DETAILED DESCRIPTION

Figure 1:
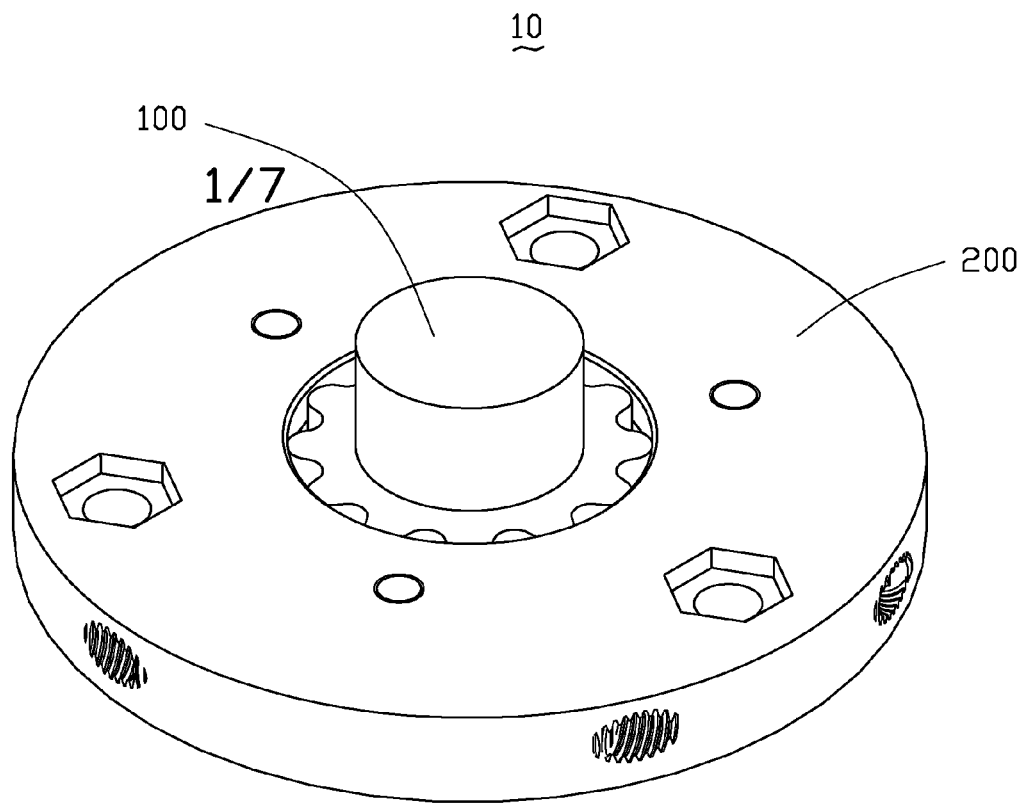
FIG. 1 is an isometric view of a transmission device according to an exemplary embodiment.

Referring to FIG. 1, a transmission device 10 according to an exemplary embodiment includes a first transmission mechanism 100 and a second transmission mechanism 200. The first transmission mechanism 100 and the second transmission mechanism 200 rotate together simultaneously. One of the first transmission mechanism 100 and the second transmission mechanism 200 is a driving mechanism, and the other is a driven mechanism. In the embodiment, the first transmission mechanism 100 is the driving mechanism, and the second transmission mechanism 200 is the driven mechanism.

Figure 2:
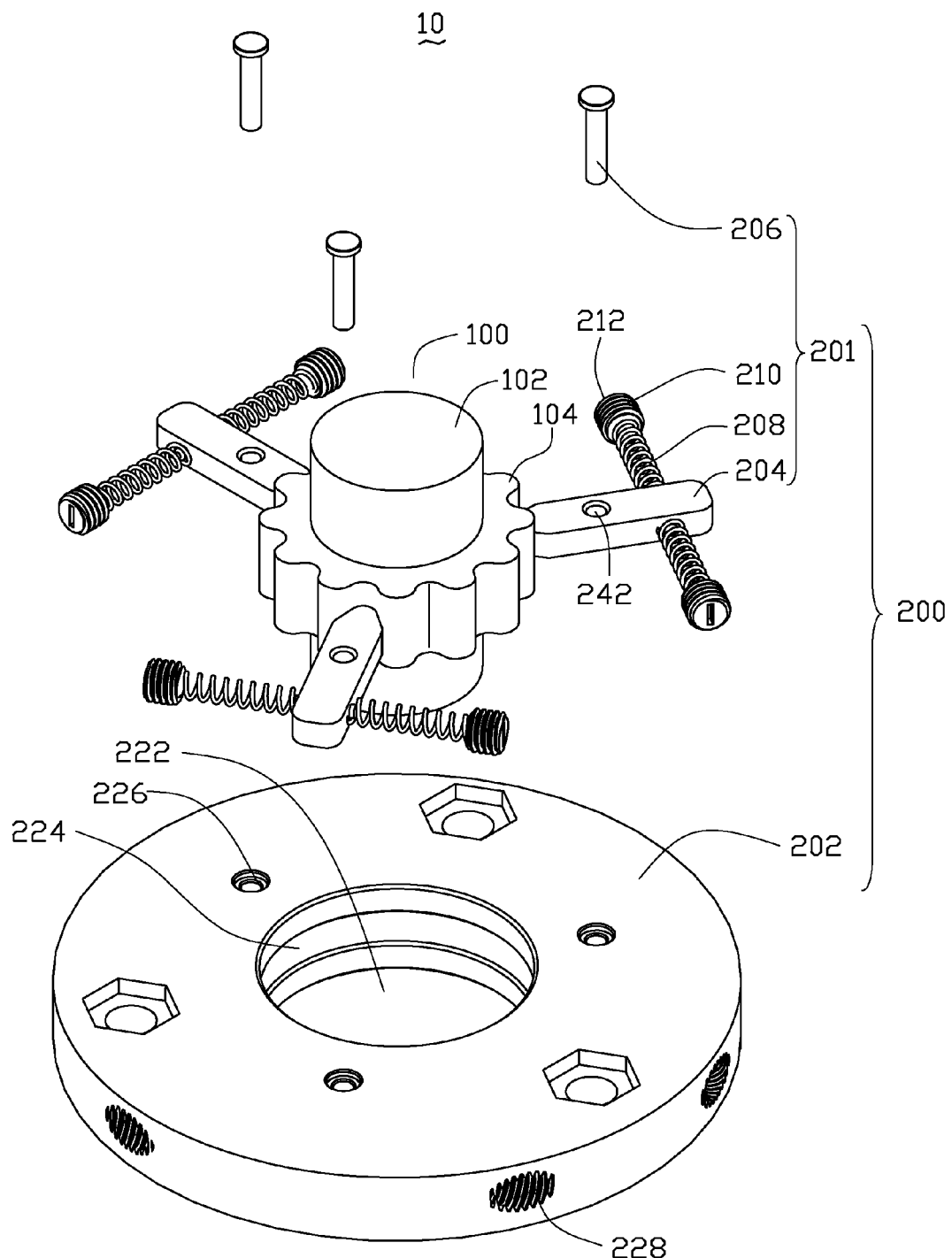
FIG. 2 is an exploded isometric view of the transmission device of FIG. 1.
Figure 3:
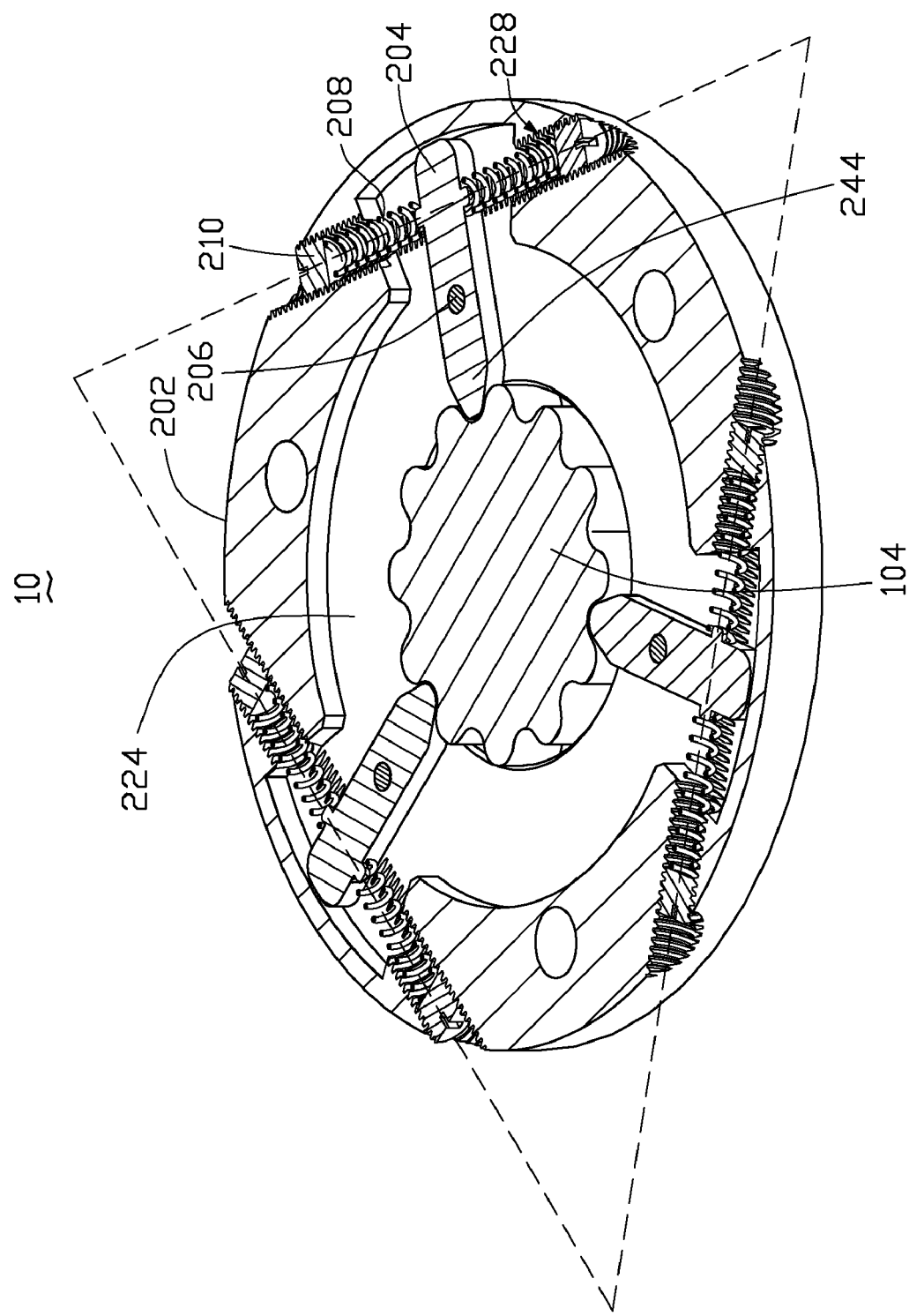
FIG. 3 is a cross sectional isometric view of a transmission device.

Referring to FIGS. 2 and 3, the first transmission mechanism 100 includes a first rotating portion 102 and an engaging portion 104 fixed on the rotating portion 102. The first rotating portion 102 is a shaft driven by a motor (not shown). The engaging portion 104 is gear-shaped, which is fixed at one end of the first rotating portion 102. A center axis of the engaging portion 104 is aligned with that of the first rotating portion 102. In the embodiment, the engaging portion 104 is a driving portion.

The second transmission mechanism 200 includes a second rotating portion 202 and three overload protection subassemblies 201.

The second rotating portion 202 is substantially round flat shape, and defines a cavity 224 and a receiving hole 222 communicating with the cavity 224. The receiving hole 222 is defined in the middle of the second rotating portion 202, and is used for receiving the engaging portion 104 of the first transmission mechanism 100. Three fixing holes 226 are defined in the second rotating portion 202 around the receiving hole 222 at a uniform interval.

The second rotating portion 202 further defines three receiving channels 228 corresponding with the fixing holes 226. Two ends of each of the three receiving channels 228 are opened in the sidewall of the second rotating portion 202. The three receiving channels 228 forms three edges of a virtual equilateral triangle correspondingly. A center of the virtual equilateral triangle is aligned with the receiving hole 222. The three receiving channels 228 define inner threads correspondingly.

The three overload protection subassemblies 201 are resiliently assembled into the second rotating portion 202. In the embodiment, the number of overload protection subassemblies 201 is three. In other embodiments, the number of overload protection subassemblies 201 may be one, two, four, or more. Similarly, the number of the receiving channels 228 and the fixing holes 226 may be one, two, four, or more.

Each overload protection subassembly 201 includes a transmission member 204, two flexible members 208, two adjustable limiting members 210, and a fixing member 206.

The transmission member 204 is elongatedly shaped, and received in the cavity 224. A positioning hole 242 is defined in the middle of the transmission member 204, and corresponds to the fixing hole 226 of the second rotating portion 202. In such a configuration, the fixing member 206 is insertable into the positioning hole 242 after passing through the fixing hole 226, so as to rotatably attach the transmission member 204 on the second rotating portion 202. One end of the transmission member 204 is tooth-shaped for meshing with the engaging portion 104, and the opposite end of the transmission member 204 is resisted between the two flexible members 208.

In the embodiment, the two flexible members 208 are two springs, and received in the corresponding receiving channel 228. The two flexible members 208 are disposed in a rotating plane of the transmission member 204. The two flexible members 208 provide balance opposite resisting forces on the two opposite side of the transmission member 204 in two opposite rotating directions.

The two adjustable limiting members 210 have external threads, and are fixed at an end of the corresponding flexible members 208 away from the transmission member 204. The two adjustable limiting members 210 are screwed into the corresponding receiving channel 228 from the sidewall of the second rotating portion 202. The two adjustable limiting members 210 are configured to press the corresponding flexible member 208 and adjust resisting forces the flexible members 208 applied on the transmission member 204.

In assembly, first, the transmission members 204 are pivotally positioned in the cavity 224 of the second rotating portion 202, by the corresponding fixing members 206 inserted into the corresponding positioning holes 242 after passing through the corresponding fixing holes 226. Then, the two flexible members 208 of each overload protection subassembly 201 are disposed in the corresponding receiving channels 228 for resisting on two opposite sides of each transmission member 204. The two adjustable limiting members 210 are screwed into the receiving channel 228, thus, the flexible members 208 resiliently hold the transmission members 204 in a non-rotatable position around the 206 correspondingly. As used herein, "non-rotatable position" means that when an actual load of the first transmission mechanism 100 is less than the predetermined load of the first transmission mechanism 100. The position of the adjustable limiting members 210 are adjustable relative the receiving channel 228 to change the resisting forces of the flexible members 208 applied on the transmission member 204, according to the predetermined load of the driving mechanism. In the embodiment, the driving mechanism is the first transmission mechanism 100. After that, the engaging portion 104 of the first transmission mechanism 100 is disposed in the receiving hole 222, and meshes with the three transmission members 204. Therefore, the first transmission mechanism 100 and the second transmission mechanism 200 may rotate simultaneously.

When the first transmission mechanism 100 overloads, the transmission members 204 overcome the resisting forces of the corresponding flexible members 208, and rotate around the fixing members 206 to detach from the engaging portion 104. The rotating force of the second rotating portion 202 is greater than the driving force of the first rotating portion 102 driving by a driver, as a result, the second rotating portion 202 would become rotatable around the first rotating portion. In this manner, the adjustable limiting member 210 prevents the first transmission mechanism 100 from damage when under overloaded.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A transmission device, comprising:
    a first transmission mechanism comprising a first rotating portion and an engaging portion fixed on the first rotating portion; and
    a second transmission mechanism comprising a second rotating portion with substantially a round flat shape and at least one overload protection subassembly, the second rotating portion defining a receiving hole in the middle thereof to receive the engaging portion, and a cavity communicating with the receiving hole, the at least one overload protection subassembly comprising:
        a transmission member pivotally positioned at an external side of the engaging portion and in the cavity of the second rotating portion, one end of the transmission member engaging with the engaging portion to rotate with the first rotating portion; and
        two flexible members resisting against an opposite end of the transmission member in opposite rotating directions of the transmission member to make the transmission member locate at a non-rotatable position with respect to the first rotating portion;
    wherein the transmission member is elongated-shaped, a positioning hole is defined in the middle of the transmission member, a fixing hole is defined in the second rotating portion corresponding to the positioning hole, a fixing member passes through the fixing hole and inserts into the positioning hole for pivotally positioning the transmission member in the cavity of the second rotating portion.

* * * * *